J. SEIL.
CLAMPING ATTACHMENT.
APPLICATION FILED SEPT. 27, 1907.
949,332.
Patented Feb. 15, 1910.
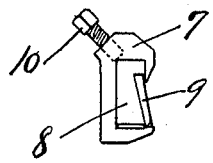
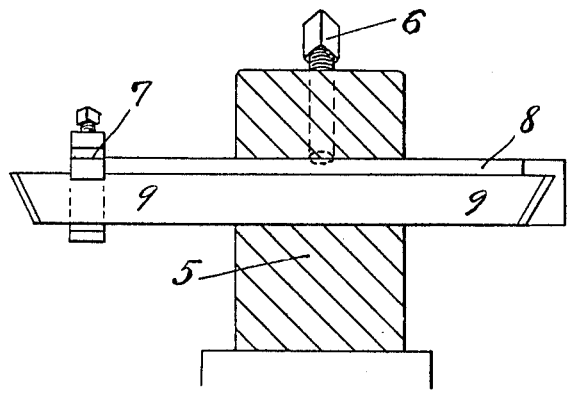
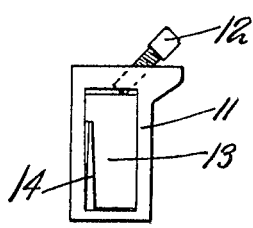
Witnesses
Louise Enterle
P. H. Daly
Joseph Seil Inventor
By his Attorney

UNITED STATES PATENT OFFICE.

JOSEPH SEIL, OF NEW YORK, N. Y.

CLAMPING ATTACHMENT.

949,332.      Specification of Letters Patent.      Patented Feb. 15, 1910.

Application filed September 27, 1907. Serial No. 394,847.

*To all whom it may concern:*

Be it known that I, JOSEPH SEIL, a citizen of the United States, residing at Brooklyn, New York city, in the county of Kings and State of New York, have invented certain new and useful Improvements in Clamping Attachments, of which the following is a specification, reference being had therein to the accompanying drawing.

My invention relates to improvements in clamping attachments, more particularly it has reference to clamping apparatus adapted for use in holding tools in a lathe or similar machine.

In clamping tools in place for use in lathes and similar machines, it has been the practice heretofore to provide a set or binding screw at the top of the tool to bind the same in place. This method has the disadvantage of allowing the tool to move laterally beneath the set screw. In my invention I employ a set screw adapted to bind the tool at an angle of about 45 degrees instead of at right angles as heretofore. In this way the binding pressure from the set screw is equally distributed downwardly and transversely, so that the liability of shifting the tool is reduced to a minimum.

Referring to the accompanying drawings Figure 1 is a vertical view partly in section showing a tool post and tool adapted for use with a lathe. Fig. 2 an end view looking from left to right at Fig. 1. Fig. 3 a plan view of the cutter of a tool. Fig. 4 a modification of one of the clamps shown in Figs. 1 and 2.

5 is the tool post of an ordinary tool carriage of a lathe or similar machine, 6 a set screw adapted to bind the tool carried therein.

7 is a clamping device adapted to receive the bar 8 and the cutter 9 and bind and hold the same by the set screw 10.

11 is a modification of the clamp 7 and shows the set screw 12 binding the bar 13 and cutter 14.

It will be observed by reference to Fig. 3 that the cutter 9 is beveled in the opposite direction at the ends thereby providing a double cutting edge of opposite angles, forming an interchangeable cutter in the same piece.

Various modifications may be made without departing from the spirit of the invention.

Having described my invention, what I claim as new and desire to secure by Letters Patent is:

1. A clamping attachment comprising a clamp adapted to be fastened in a tool post, a bar having an angular tool seat provided with a shoulder at one side only, a tool adapted to be supported beneath said shoulder, said bar and tool being adapted to be held within said clamp by a binding screw entering said clamp and forcing said bar diagonally of the plane of said tool.

2. A clamping attachment comprising a rectangular clamp adapted to be fastened in a tool post, a bar having an angular tool seat provided with a shoulder at one side only, a tool adapted to be supported beneath said shoulder, said bar and tool being adapted to be forced against one of the walls of said rectangular clamp by binding means directed diagonally of the plane of said tool.

In testimony whereof I affix my signature in presence of two witnesses.

JOSEPH SEIL.

Witnesses:
    LOUISE ENDERLE,
    THOMAS A. HILL.